United States Patent

Blanchard

[11] Patent Number: 5,949,487
[45] Date of Patent: *Sep. 7, 1999

[54] VIDEO EDITING BUFFER MANAGEMENT

[75] Inventor: Simon Blanchard, Horley, United Kingdom

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/565,697

[22] Filed: Nov. 30, 1995

[30] Foreign Application Priority Data

Dec. 2, 1994 [GB] United Kingdom ............. 9424436

[51] Int. Cl.⁶ ................................... H04N 7/12
[52] U.S. Cl. .................... 348/403; 348/405; 348/419
[58] Field of Search ........................... 348/403, 404, 348/405, 409, 415, 419, 423, 584; 364/514 R; 386/68, 81, 82

[56] References Cited

U.S. PATENT DOCUMENTS

| | | | |
|---|---|---|---|
| 5,231,484 | 7/1993 | Gonzales et al. | 348/405 |
| 5,241,383 | 8/1993 | Chen et al. | 348/405 |
| 5,283,646 | 2/1994 | Bruder | 348/415 |
| 5,534,944 | 7/1996 | Egawa et al. | 348/584 |
| 5,543,932 | 8/1996 | Chang et al. | 386/81 |
| 5,606,371 | 2/1997 | Klein Gunnewiek et al. | 348/405 |
| 5,617,145 | 4/1997 | Huang et al. | 348/423 |
| 5,623,424 | 4/1997 | Azadegan et al. | 364/514 R |

FOREIGN PATENT DOCUMENTS

| | | |
|---|---|---|
| 0655867 | 5/1995 | European Pat. Off. . |
| 4343450 | 6/1995 | Germany . |
| 1-136468 | 5/1989 | Japan . |

OTHER PUBLICATIONS

"Gradient–based buffer control technique for MPEG", Proceedings of the SPIE, vol. 2501, pp. 1502–1513 (Jul. 1995).

*Primary Examiner*—Tommy P. Chin
*Assistant Examiner*—Y. Lee
*Attorney, Agent, or Firm*—Laurie E. Gathman

[57] ABSTRACT

A method and apparatus are provided for encoding of digital video signals in the form of video clips (A,B) to enable them to be seamlessly joined without requiring reset of a decoder to a starting state. The system uses an encoder having a coding stage and an encoder buffer, and comprises successively encoding the pictures of a clip according to a predetermined coding scheme (suitably according to MPEG standards), reading the encoded pictures into the buffer, and subsequently reading the encoded clip out of the buffer at a substantially constant bit rate. To enable simple joining of the clips, a predetermined encoder buffer occupancy ($B_{ic}$) is specified with a controllably varied target number of bits being used to encode a picture. The targeting produces an encoder buffer occupancy substantially equal to the predetermined buffer occupancy ($B_{ic}$) at the moment the last picture of the segment has been read into the buffer. Particular applications for the technique are in interactive video systems where the user can affect a narrative flow without having discontinuities in the presentation of that narrative.

8 Claims, 2 Drawing Sheets

VIDEO EDITING BUFFER MANAGEMENT

BACKGROUND OF THE INVENTION

The present invention relates to the coding and editing of audio and video signals and in particular to producing segments of video material that can be joined together on the fly.

Typically when two video clips are played one after the other the decoder is reset to its start state before it decodes the second clip. This leads to the user seeing the last frame of the first clip frozen on the screen while the decoder reinitializes itself and starts decoding the next. Accompanying the reinitialization there is usually a mute in the audio. This type of title behavior is intrusive for the user, lessening their feeling of immersion within the title.

There is, accordingly, a need for seamless joining in which the transition between the end of one clip and the start of the next is not noticeable to the decoder. This implies that from the user's point of view there is no perceptible change in the viewed frame rate and the audio continues uninterrupted. Applications for seamless video are numerous, some examples from a CD-i perspective include video sequence backgrounds for sprites (computer generated images); an example use of this technique would be an animated character running in front of an MPEG coded video sequence. Another is a series of character-user interactions presented as short seamless clips where the outcome of the interaction will determine which clip appears next. A development of this is interactive motion pictures where the user (viewer) can influence the storyline. Branch points along the path a user chooses to take through the interactive movie should appear seamless, otherwise the user will lose the suspension of disbelief normally associated with watching a movie.

SUMMARY OF THE INVENTION

It is therefore an object of the present invention to enable coding of video frame sequences in a way which allows them to be joined without causing perceptible disturbances.

In accordance with the present invention there is provided a method for encoding of digital video signals, in the form of segments each comprising two or more pictures, and in an encoder apparatus having a coding stage and an encoder buffer, the method comprising the steps of: successively encoding the pictures of a segment according to a predetermined coding scheme; reading the encoded pictures into the buffer; and reading the encoded segment out of the buffer at a substantially constant bit rate; characterized in that a predetermined buffer occupancy is specified and in that a target number of bits used to encode a picture is controllably varied such as to produce an encoder buffer occupancy substantially equal to the said predetermined buffer occupancy at the moment the last picture of the segment has been read into the buffer.

By targeting a buffer occupancy for all segments, irrespective of their length, the occupancy at the beginning of any segment will be substantially the same such that joining of segments will be a relatively simple task.

Rather than modifying the last picture of a segment, a respective target number of bits may be specified for each of the last K pictures of a segment, where K is an integer. This would allow changes to be introduced over a number of pictures to avoid visible distortion which might occur if a large change was required to be made to the last picture of the segment alone.

Suitably, the coding stage is operable to encode a picture according to the MPEG standard and at a number of quantization levels, with the quantization level used being chosen in dependence on the target level set. If required, for example, if such quantization levels are limited, the coding stage may add one or more zero-value bits to an encoded picture to reach the target number, if the number of bits in the encoded picture is below the target.

Also in accordance with the present invention there is provided a digital video signal encoder apparatus configured for the encoding of image segments, where each segment comprises two or more pictures, the apparatus comprising: an encoding stage arranged to receive successive pictures of a segment and encode them according to a predetermined coding scheme; and a buffer coupled to receive successive encoded pictures from the encoding stage and arranged to output an encoded segment at a substantially constant bit rate; characterized in that the encoding stage is operable to encode pictures in a controllably variable number of bits, the apparatus further comprising target setting means arranged to monitor the encoder stage output and control the number of bits per picture of the encoder stage on the basis thereof such as to produce a predetermined buffer occupancy at the moment the last picture of a segment is read into the buffer.

The target setting means may suitably be arranged to control the number of bits per picture for the last K pictures of a segment as described above, and the encoding stage may suitably be configured to add zero-value bits to an encoded picture to make up the number specified by the target setting means.

Further in accordance with the present invention there is provided a digital video image segment encoded by the above described method, and an optical disc carrying a plurality of such encoded segments, as defined in the attached claims to which reference should now be made.

BRIEF DESCRIPTION OF THE DRAWING

Preferred embodiments will now be described by way of example only, and with reference to the accompanying drawings in which.

DETAILED DESCRIPTION OF THE PREFERRED EMBODIMENTS

The following description considers video coders operating according to the MPEG standards (ISO 11172-2 for MPEG1 and ISO 13818-2 for MPEG2) although the skilled practitioner will recognize the applicability of the present invention to other video coding schemes not in conformance with the MPEG standard.

Any coding standard must be developed with models of how the encoder and decoder interface to one another. As an encoder runs it has to model what will happen in the decoder so that it never sends the decoder into an illegal (overflow or underflow) state. Similarly, the decoder must support the same model that the encoder used such that it remains in a legal state and produces the output the coder intended. MPEG is no exception to this rule. The model of the decoder in MPEG is called the Video Buffering Verifier (VBV).

Figure 1:
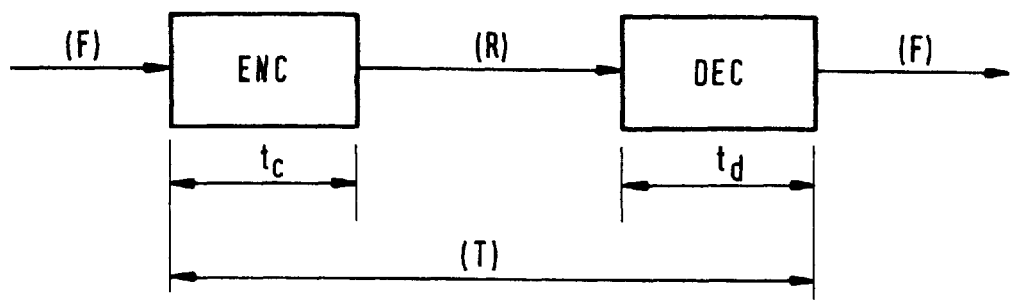
FIG. 1 shows an idealized model of the MPEG encoder/decoder relationship.

FIG. 1 shows an idealized model of the MPEG encoder/decoder relationship. Assuming the system is operating in real-time and that the channel delay is negligible, the following sequence of events occurs:
1. Digitized frames are fed into the encoder at a constant frame rate F.
2. The encoder codes these frames introducing a variable delay of $t_c$ seconds.
3. The coded frames are transferred to the decoder at a constant bit rate R.
4. The decoder decodes the frames introducing a variable delay of $t_d$ seconds.
5. The decoded frames are displayed at the same constant frame rate F.

Now in order for the above system to work it will be understood that the delay introduced in the encode-decode cycle must be constant to enable maintenance of a constant frame rate at the output of the decoder. This is summarized in equation 1 as:

$$t_c + t_d = T \qquad (1)$$

Where T is a constant.

Figure 2:
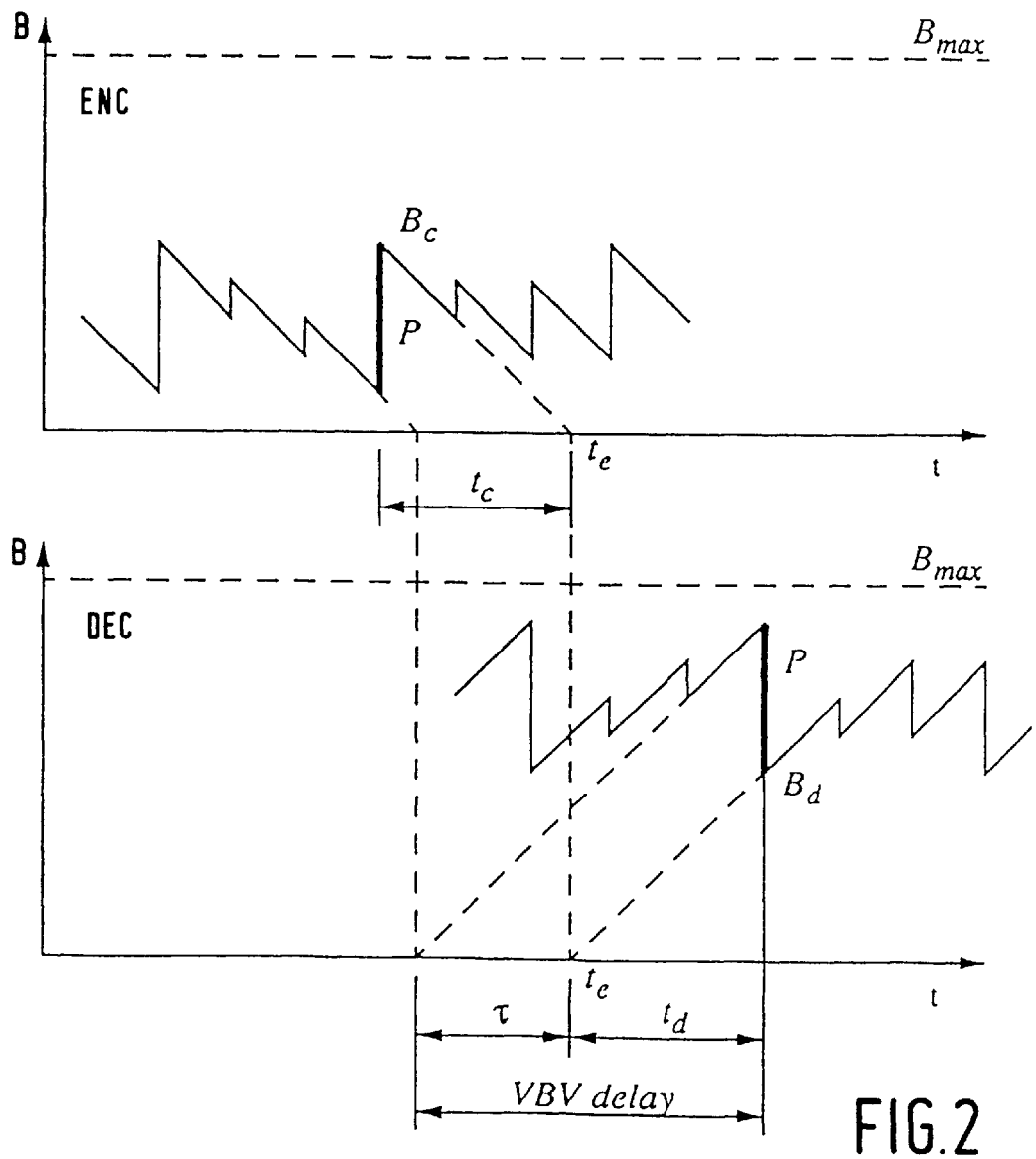
FIG. 2 represents encoder and decoder buffer contents for a sequence of pictures.

FIG. 2 shows graphs of buffer occupancy B against time t showing how the encoder and decoder buffers are related. The discussion that follows will concentrate on the picture indicated by the bold line containing P bits. The data rate of the system is a constant R bits per second. Note that P is an arbitrary picture within the coded sequence and that when it is introduced the buffer is not assumed to be empty, rather the buffer contains a number of bits that represent previous pictures placed in the buffer that have yet to be completely flushed.

Dealing first with the encoder buffer, the model used in software encoders is that the encoder introduces pictures instantaneously into its output buffer and the buffer is flushed at a constant R bits per second. Considering the picture P, the encoder introduces the picture P into the buffer taking its occupancy up to $B_c$ bits, the buffer is emptied at R bits per second, and, after a certain time, $t_c$, all the bits in P are removed from the buffer. The time that this occurs at is $t_e$ in FIG. 2. Accordingly, the encoder buffer delay for picture P can be worked out from the buffer occupancy and the emptying rate.

By the time $t_e$, all the bits that make up P have left the encoder's buffer and entered into the decoder's buffer. There is a delay $t_d$ between all the bits entering the decoder's buffer and the picture being removed. If $B_d$ is the decoder buffer occupancy after P has been removed then the decoder buffer delay can also be calculated from the buffer occupancy and the emptying rate.

Bringing these delay values into equation (1) we can write:

$$t_c + t_d = T = \frac{B_c}{R} + \frac{B_d}{R} \qquad (2)$$

To find the value of T, it is assumed that $t_d$ approaches zero. At this point, $t_c$ must have its maximum value and be equal to T. By looking at FIG. 2 we can see that the maximum value ($t_{c.max}$) is $$t_{c.max} = T = \frac{B_{max}}{R} \qquad (3)$$

Where $B_{max}$ is the maximum buffer size used by the encoder.
By putting (2) and (3) together we get:

$$B_{max} = B_c + B_d \qquad (4)$$

Equation (4) shows the relationship between the state of the encoders buffer at the instant after a picture has been introduced and the decoders buffer at the instant after the same picture has been removed. This is known as the complementary buffer relationship.

The MPEG standard (ISO 11172-2) at section 2.4.3.4 defines the VBV delay as the time needed to fill the VBV buffer from its initial empty state at the target bit rate R, to the correct level immediately before the current picture is removed from the buffer. With reference to FIG. 2 it can be seen that the VBV delay can be thought of as the sum of two values $\tau$ and $t_d$. Knowing $t_d$ and bearing in mind that $\tau$ is the time it takes to deliver the bits that make up P at the bit rate R, the VBV delay is given by:

$$\tau + t_d = VBV delay = \frac{P + B_d}{R} \qquad (5)$$

which corresponds to the ISO definition of the VBV delay. Considered another way, the VBV delay is the time it takes to deliver the bits that make up the picture added to the delay introduced in the buffer.

Figure 3:
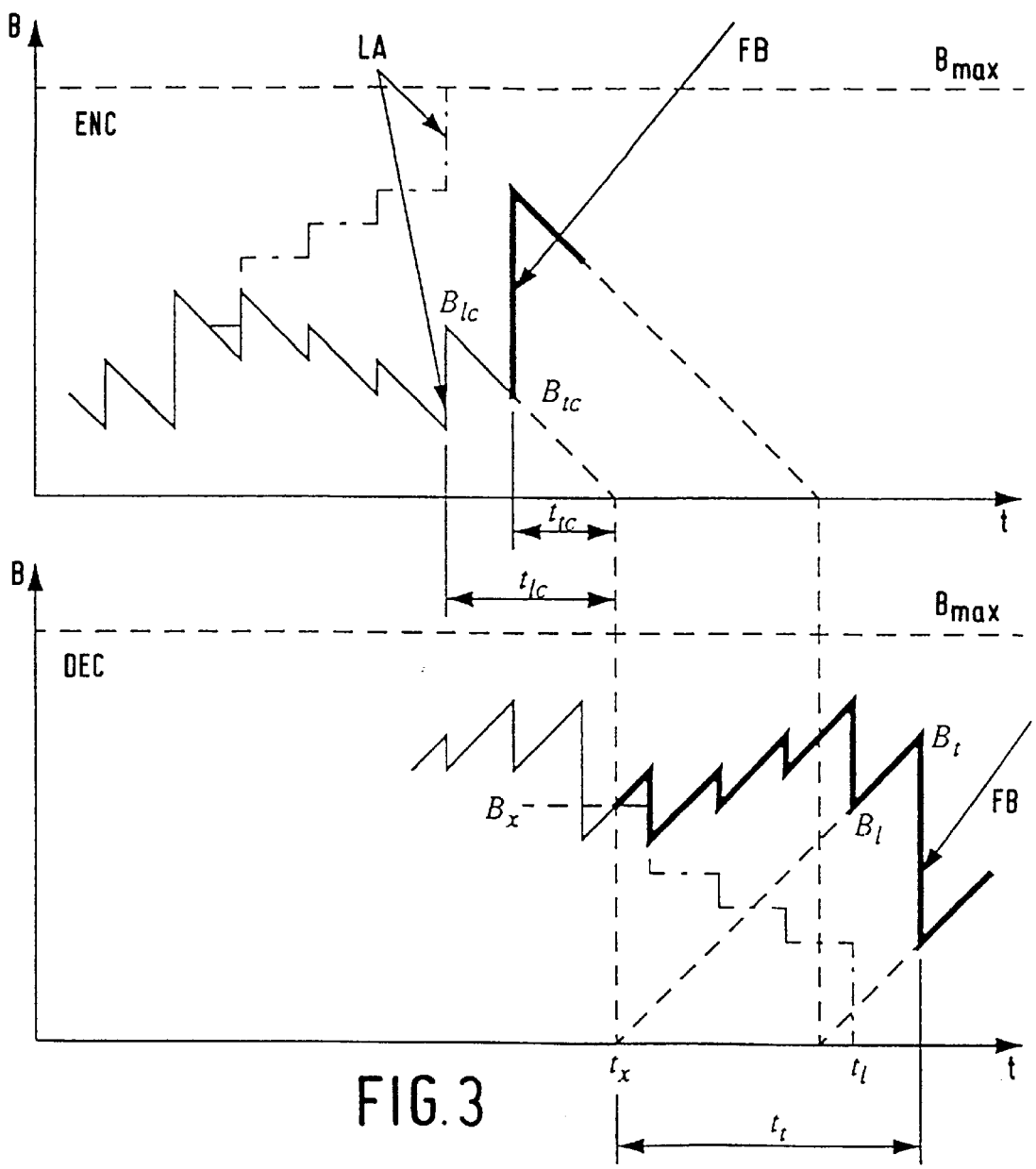
FIG. 3 represents encoder and decoder buffer contents at the joining of two sequences.

FIG. 3 shows graphs of what happens to the encoder and decoder buffer states as one sequence of pictures A ends and another B starts. LA indicates the last picture of sequence A; FB indicates the first picture of sequence B. The change of delivery data from sequence A to sequence B is shown by a change in thickness of the buffer occupancy line with the chain-linked line indicating pictures from sequence A. At some time $t_x$ all the data for sequence A has been delivered (i.e cleared from the encoder buffer) and the decoder buffer has an occupancy of $B_x$ bits. From this time on all the data delivered to the decoder buffer is for sequence B. Some pictures from the end of sequence A are still in the decoder buffer however, but all are removed by time $t_i$ when the buffer has an occupancy of $B_i$ bits.

The term targeting is used herein to refer to the process the encoder goes through when it is trying to achieve a certain occupancy in the VBV buffer. During targeting the encoder assumes that the VBV buffer has a certain target occupancy when the first picture it has coded is put into the buffer. This places an upper limit on the size (in number of bits) of the first picture. At the end of a coding run the encoder targets the VBV occupancy at the time just before the first picture for the next sequence would be removed from the buffer, point $B_t$ in FIG. 3. The encoder targets this state by changing the size of the last, or last few pictures, as it codes them.

The process the encoder goes through when producing a coded piece of video with targeted VBV states will now be described. In the example shown in FIG. 3 the encoder has been set to target the state $B_t$ for the decoder buffer. This state represents the VBV buffer occupancy at the time just before the first picture of the new sequence is removed. Assuming that the previous sequence was operating at the same bit rate and frame rate, the buffer occupancy at the time just after removal of the last picture of the previous sequence is given as:

$$B_i = B_t - RT \qquad (6)$$

where: $B_i$ and $B_t$ are as shown in FIG. 3, R is the bit rate, and T is the frame period.

Using equation (4) we can derive the corresponding states in the encoders output buffer for $B_t$ and $B_i$:

$$B_{tc} = B_{max} - B_t \quad (7)$$

$$B_{ic} = B_{max} - B_i \quad (8)$$

Due to the constant bit rate R, the delays associated with these states are:

$$t_{tc} = \frac{B_{tc}}{R} \quad (9)$$

$$t_{lc} = \frac{B_{lc}}{R} \quad (10)$$

When an encoder runs it is usually separate from the decoder and manages picture sizes based on its output buffer state rather than transforming to and from the VBV buffer state. Accordingly, the following discussion refers to buffer levels $B_{tc}$ and $B_{ic}$ (FIG. 3).

When targeting a start state, the encoder assumes a certain occupancy in its buffer at the point when it introduces the first picture. This buffer occupancy is $B_{tc}$ bits, as derived in equation (7), which represents the residual bits from the end of the previous sequence. The presence of these bits limits the maximum size of the first picture to be $B_t$ bits and continues to have an effect on the limits of future picture sizes until all the bits have been removed, after time $t_{tc}$.

From the encoder's point of view, start state targeting is very simple since all that is required is for it to set its initial occupancy to $B_{tc}$ bits rather than the conventional start state of being empty.

When the encoder approaches the end of a segment, it tries to target the point $B_{ic}$. In other words, the encoder forces the size of the last picture to be such that when it puts it into the buffer the occupancy will increase to $B_{ic}$ bits. To arrive at the correct picture size may be achieved by an iterative process:
1. The coder has a first go at coding the picture.
2. If the picture is too big (number of bits) it re-codes with increased quantization size.
3. If the picture is too small it can stuff with zero bytes.

As will be understood, it would produce a poor quality picture if a large amount of size adjustment were required and all occurred on the last picture. To avoid this the encoder can have a target number of bits for the last GOP (Group of Pictures) within the segment, and a target number of bits for each of the K pictures within the GOP. This allows the encoder to gradually approach the desired buffer state.

The buffer occupancy target has to be large enough so that, for the pictures that make up the target, the picture quantization size is not so large as to have a detrimental effect on picture quality. The target also has to be large enough so that it is actually possible for the coder to make pictures that fit into the buffer without producing buffer underflow.

The size of the decoder buffer occupancy target is proportional to the time it takes to reach that target, since in the model we are operating at a constant bit rate. For some interactive applications the fill time is significant because this is the delay between starting play of a clip and pictures appearing on the screen. From the point of view of speed of reaction to user interaction the smaller the target the better. Experiments have shown that targeting a VBV occupancy of around 75% of maximum fullness gives good results. That translates to about 245760 bits for a typical sequence according to the constrained system parameters stream (a subset of the MPEG standard covering CD applications). In practice, however, it is possible to target at a lower level, typically 204000 bits.

Figure 4:
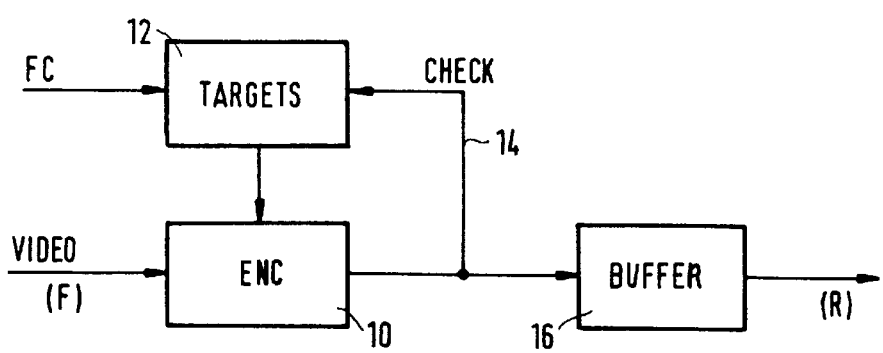
FIG. 4 is a block diagram of an encoder apparatus embodying the present invention.

A schematic representation of the encoder is shown in FIG. 4. A received video signal (at constant frame rate F) is passed to coding stage 10 for encoding according to the MPEG standard. The frame count FC of the incoming video signal is also input to a target setting stage 12. The target setting stage determines the level of quantization (or amount of zero-bit stuffing) to be applied to the current picture by the coding stage 10 to achieve the buffer occupancy $B_{ic}$ at the end of the segment. The coded signal in the form of GOPs having controlled bit allocation is read to an encoder buffer 16 and output to a transmission channel at the data transmission rate R. A feedback path 14 from the encoder output to the target setting stage 12 enables confirmation that target levels are being attained.

From reading the present disclosure, other variations will be apparent to persons skilled in the art. Such variations may involve other features which are already known in the methods and apparatuses for editing of audio and/or video signals and component parts thereof and which may be used instead of or in addition to features already described herein. Although claims have been formulated in this application to particular combinations of features, it should be understood that the scope of the disclosure of the present application also includes any novel feature or any novel combination of features disclosed herein either implicitly or explicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method for encoding segments of digital video signals using an encoder apparatus which includes a coding stage and an encoder buffer, each of the segments being comprised of two or more pictures, the method comprising, for each segment, the steps of:

specifying a predetermined buffer occupancy level for the encoder buffer;

successively encoding pictures of the segment according to a predetermined coding scheme so as to produce encoded pictures which together form an encoded segment;

reading the encoded segment into the encoder buffer; and reading the encoded segment out of the encoder buffer at a substantially constant bit rate;

wherein the step of successively encoding pictures of the segment comprises controllably varying a target number of bits used to encode a group of K (K>1) pictures at the end of the segment by iteratively coding the K pictures with different quantization sizes until a quantization size is reached for each picture at which the buffer occupancy level becomes substantially equal to the predetermined buffer occupancy level at the moment that the last picture in the segment has been read into the encoder buffer; and wherein the quantization sizes for the K pictures are selected so that each of the K pictures is comprised of a target number of bits that allows the predetermined buffer occupancy level to be reached gradually.

2. The method as claimed in claim 1, wherein the coding stage is operable to encode each picture at a plurality of quantization levels, and further comprising the step of selecting one of the plurality of quantization levels for at least the last picture in the segment based on the target number of bits specified for that picture.

3. The method as claimed in claim 1, further comprising the step of adding one or more zero-value bits to at least one of the encoded pictures in the encoded segment if the number of bits in that encoded picture is below the target number of bits specified for that picture.

4. The method as claimed in claim 1, wherein the pictures of the segment are encoded according to the MPEG standard.

5. A digital video image segment encoded by the method of claim 1, the segment comprising a sequence of pictures encoded according to a predetermined coding scheme, wherein each of the last K pictures of the segment (where K is an integer) are encoded in respective numbers of bits such that, when the encoded segment is read at substantially constant bit rate into a decoder buffer from which successive pictures are removed for decoding at a real time display rate, a predetermined buffer occupancy level is realized at the moment the data for the last picture of the segment has been read into the buffer.

6. An optical disc carrying a plurality of encoded video image segments according to claim 5, wherein all segments provide the same predetermined buffer occupancy level following reading of the respective last pictures thereof into the buffer.

7. A digital video signal encoder apparatus for encoding image segments each comprised of two or more pictures, the apparatus comprising:

an encoding stage coupled to receive successive pictures of each segment and to encode the successive pictures according to a predetermined coding scheme so as to produce successive encoded segments, each encoded segment being comprised of two or more successive encoded pictures and the encoding stage being capable of controllably varying a number of bits used to encode pictures in each segment;

a buffer coupled to receive successive encoded pictures of each encoded segment from the encoding stage and arranged to output each encoded segment at a substantially constant bit rate; and target setting means arranged to monitor the encoder stage and to control the number of bits used by the encoder stage in encoding a group of K (K>1) pictures at the end of each segment by iteratively coding the K pictures with different quantization sizes until a quantization size is reached for each picture at which the buffer occupancy level becomes substantially equal to a predetermined buffer occupancy level at the moment that the last picture of the segment is read into the buffer;

wherein the quantization sizes for the K pictures are selected so that each of the K pictures is comprised of a target number of bits that allows the predetermined buffer occupancy level to be reached gradually.

8. The apparatus as claimed in claim 7, wherein the encoding stage is configured to add zero-value bits to at least one of the encoded pictures in each segment to make up the number of bits specified by the target setting means for that picture whenever the predetermined coding scheme requires fewer bits than the number of bits specified by the target setting means for coding that picture.

* * * * *